US005362348A

United States Patent [19]

Gutherie

[11] Patent Number: 5,362,348

[45] Date of Patent: Nov. 8, 1994

[54] METHOD AND APPARATUS FOR APPLYING FOIL INDICIA ON A VIDEO CASSETTE

[76] Inventor: William T. Gutherie, 83553 Port Cove, Unit 51, Waterford, Mich. 48326

[21] Appl. No.: 145,035

[22] Filed: Oct. 29, 1993

Related U.S. Application Data

[63] Continuation of Ser. No. 996,671, Dec. 24, 1992, abandoned.

[51] Int. Cl.[5] ........................ B41M 5/00; B32B 3/00; B65C 1/00; B44C 1/00

[52] U.S. Cl. .................................... 156/233; 156/240; 156/277; 156/540; 156/DIG. 27; 493/375; 40/312

[58] Field of Search ....... 156/540, 542, 476, DIG. 27, 156/230, 233, 277; 40/312; 53/415, 137; 493/375

[56] References Cited

U.S. PATENT DOCUMENTS

| | | | |
|---|---|---|---|
| 3,620,881 | 11/1971 | Kannegiesser | 156/540 X |
| 3,634,174 | 1/1972 | Warsager | 156/540 |
| 4,302,277 | 11/1981 | Ilsemann | 156/570 X |
| 4,657,622 | 4/1987 | Paules | 156/DIG. 27 X |

*Primary Examiner*—David A. Simmons
*Assistant Examiner*—Charles Rainwater
*Attorney, Agent, or Firm*—Brooks & Kushman

[57] ABSTRACT

A method of applying a foil indicia on a video cassette including the steps of mounting a video cassette on a conveyor, indexing the video cassette to a stamping position adjacent a first hot foil stamping means and a second hot foil stamping means, applying a foil indicia on a first predetermined surface of the video cassette, applying a second foil indicia on a second predetermined surface of the video cassette, where the first predetermined surface and second predetermined surface are disposed at a substantial angular relation to each other, indexing the video cassette to an exit position, and removing the video cassette from the conveyor. An apparatus for carrying out the method of the present invention is also disclosed.

12 Claims, 2 Drawing Sheets

METHOD AND APPARATUS FOR APPLYING FOIL INDICIA ON A VIDEO CASSETTE

This is a continuation of copending application Ser. No. 07/996,671, now abandoned.

TECHNICAL FIELD

The present invention relates to method and apparatus for applying identification and/or marketing indicia onto a tape cassette.

BACKGROUND OF THE INVENTION

With the advent of the video cassette recorder and the availability of low-priced, compact video cameras, the use of video cassettes for a variety of purposes, including educational and training purposes, has become widespread. Consumer familiarity with the equipment, and the ease of operation of the equipment has fueled this interest. Thus, there has been created a demand for training tapes which are produced in relatively low volumes, since the number of people involved and having this special interest is, and will always be, relatively low. For example, one might desire a training tape for automotive mechanics, illustrating the manner of overhauling the Lamborghini fuel injection system. Given the low number of Lamborghini servicing organizations, the demand for such a training tape would be relatively low in comparison to the demand for other video cassettes for other purposes.

Nevertheless, within the industry, it is common practice to contract the reproduction of tape cassettes where more than a few copies of the tape is required. These organizations are known as "loaders", who will manufacture or have manufactured for them the cassette shells, and who will load the shells with the tape and then assemble the shells into a finished cassette, applying to the cassette a time stamp indicating the length of the tape, and perhaps other distinguishing or marketing indicia.

Conventionally, the time stamp is added to the cassette by the "loaders" by an in-process hot foil stamping process. This involves feeding the cassettes one at a time, in sequence, along a continuously moving conveyor belt from a loading station to a hot foil stamping press, momentarily stopping the conveyor and stamping a single cassette under pressure of a hot foil stamping press. Next, the stamped cassette is released allowing it to be conveyed to a loading station as the next cassette in sequence is brought under the hot foil stamping press.

Prior to the subject invention, no further identification or marketing indicia was placed in process on any other panel of the cassette by hot foil stamping or any similar process. Rather, it has been the industry practice to apply to the dust door component of the cassette, the hot foil stamp and thereafter assemble the cassette and further process the assembled cassette as described above. Because of the extra handling, increased inventory requirements and added expense, this process has only been used where the number of cassettes to be produced are for a particular customer requiring cassettes in large volumes.

The hot foil stamping technique described above is a manufacturing process whereby transfer of material from a foil onto a substrate is achieved by the application of heat and pressure to the foil and plastic. The transfer is generally in the form of a print, design or marketing indicia, all of which is determined by the particular shape of the die affecting the transfer.

In an actual deposition of the foil indicia, the die is pressed against the substrate on which the indicia is required, sandwiching the foil between the substrate and the die, effecting material transfer from the foil carriage to the substrate. When the transfer of material to the substrate occurs, it is necessary that the die affecting transfer and the foil be in contact with that part of the substrate which must be printed or decorated. Any lack of contact will normally result in an incomplete deposit of material and, as such, a poor quality indicia on the substrate. Thus, proper clamping or stabilization of a video cassette in the above-described process is necessary to effectuate a high quality transfer of indicia onto a video cassette tape.

SUMMARY OF THE INVENTION

The present invention contemplates the relatively inexpensive and attractive packaging of video cassettes, having marketing or other decorative indicia, attractively produced in process following the assembly of the cassette.

The present invention further contemplates concurrently applying on a video cassette by hot foil stamping technique, marketing or other identification and indicia on one panel, i.e. a dust door, of the cassette while a time stamp is applied by the same technique on a second panel of the cassette.

The invention further contemplates concurrently applying on a cassette by hot foil stamping technique, marketing or other identification and indicia on one panel, i.e. a dust door, of the cassette while a time stamp is applied by the same technique on a second panel of the cassette, wherein the plane of the first panel is disposed in a substantial angular relation to the plane of the second panel.

The invention still further contemplates concurrently applying on a cassette by hot foil stamping technique two foil indicia applied on two surfaces of the video cassette affording a better deposition of foil indicia on the video cassette creating a higher quality indicia marking.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
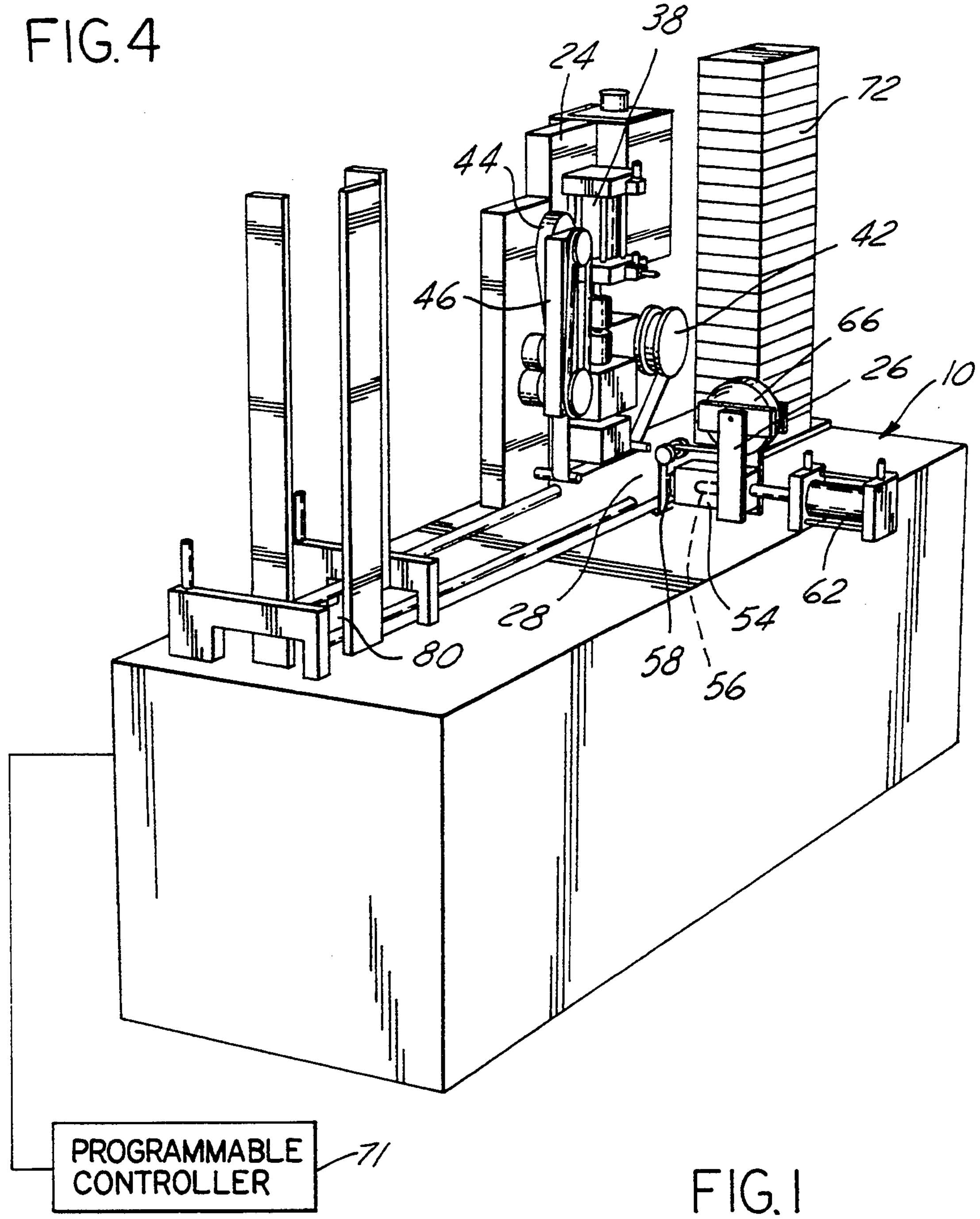
FIG. 1 is a perspective view of the apparatus for applying foil indicia according to the present invention.
Figure 3:
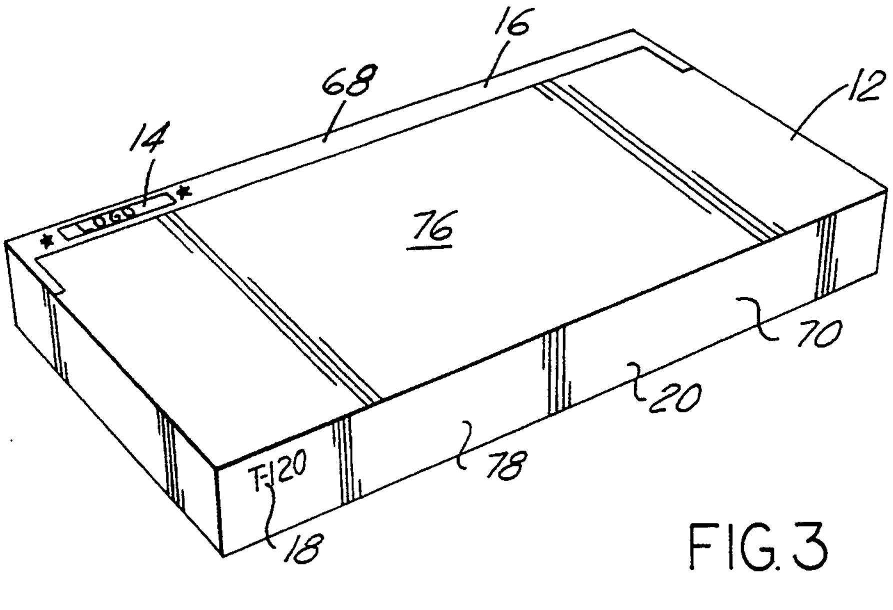
FIG. 3 is a video tape cassette with foil indicia illustrating the location of the indicia as applied by the present invention.

Referring to FIG. 1 of the drawings, an apparatus for applying foil indicia on a video cassette is shown generally as reference numeral 10. FIG. 3 shows a video cassette 12 having foil indicia 14 applied on the dust cover 16 and a second foil indicia 18 applied on the spine 20 of the video cassette. Foil indicia 14 is commonly a marketing design or symbol representative of a particular manufacturer, business or association, etc. The second foil indicia 18 is commonly a time stamp for indicating the particular time length of the video cassette tape, for example, T-60, T-90 or T-120 minute tapes.

Figure 2:
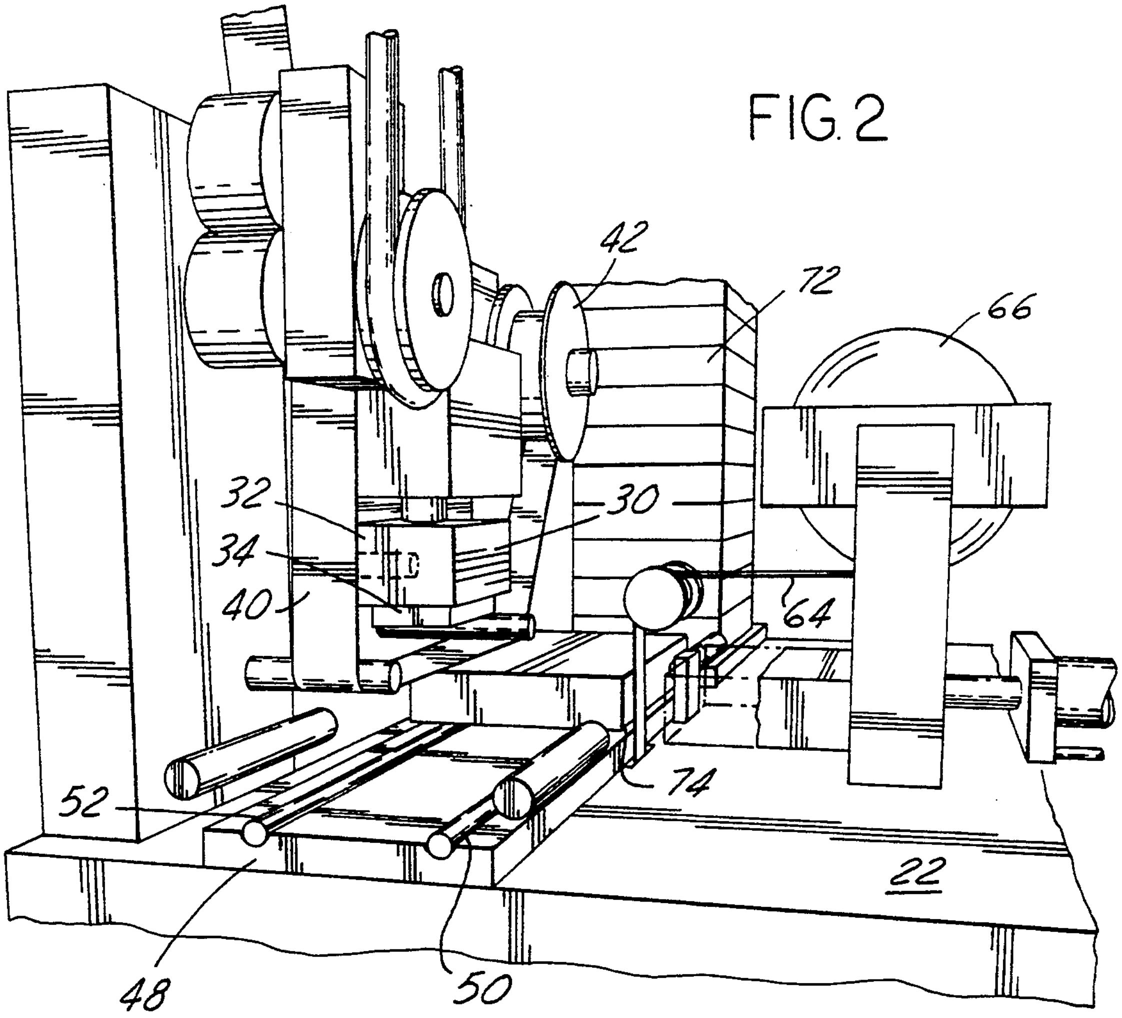
FIG. 2 is a perspective view of a work station of the apparatus for applying foil indicia according to the present invention.

The apparatus of the present invention includes a base 22. Affixed to base 22 is a first hot foil stamping means 24 and second hot foil stamping means 26. First hot foil stamping means 24 and second hot foil stamping means 26 are located adjacent each other and comprise workstation 28. As shown in FIGS. 1 and 2, first hot foil stamping means 24 includes a heating block 30 and a heating element 32 disposed within heating block 30. Heating block 30 is a block of metal such as brass or iron. Heating element 32 must have the capacity to translate sufficient heat to raise the overall temperature of heating block 30 to approximately 600° F.

Figure 4:
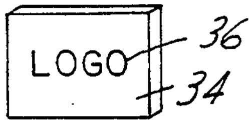
FIG. 4 is a perspective view of a die including an indicia design according to the present invention.

First hot foil stamping means 24 also includes a die 34 which is removably affixed to heating block 30. As shown in FIG. 4, die 34 includes an indicia design 36 which is to be transferred to the video tape surface that is being stamped. Reciprocating fluid biasing cylinder 38 cooperates with heating block 30 for generating linear force (i.e. pressure) on the heating block. A continuous sheet of hot melt foil 40 is supported by feeding spool 42 and take-up spool 44. A foil feeding means 46 for indexing hot melt foil is located adjacent the hot melt spools 42 and 44.

Second hot foil stamping means 26 is located directly adjacent first hot foil stamping means 24 at workstation 28. First hot foil stamping means 24 reciprocates in a substantially vertical direction while second hot foil stamping means 26 reciprocates in a substantially horizontal direction. Second hot foil stamping means 26 includes essentially identical elements as those included and disclosed in first hot foil stamping means 24.

Second hot foil stamping means 26 includes a heating block 54, a heating element 56, and a die 58. Die 58 includes an indicia design 36. Second hot foil stamping means 26 also includes reciprocating fluid biasing cylinder 62, a continuous sheet of hot melt foil 64 and a feeding spool 66. The take-up spool and foil feeding means for indexing the hot foil for second hot foil stamping means 26 is not shown but functions in substantially the same manner as take up spool 44 and foil feeding means 46 of the first hot foil stamping means.

The apparatus of the present invention also includes a reciprocating conveyor 48 including two drive belts 50 and 52. Conveyor 48 is run by an electric motor and chain gear system not shown but commonly known in the art.

As shown in FIG. 1, the apparatus of the present invention also includes a programmable controller 71 for controlling the various operations of the system. The programmable controller of the present invention is a GE Fanuc Series/Junior Programmable Controller commonly used in the industry, and the details thereof are incorporated herein by reference as part of the description of the present invention. This programmable controller, among other things, signals simultaneous operation of both the first hot foil stamping means and the second hot foil stamping means such that the foil indicia are applied to a first surface 68 of the video tape and a second surface 70 of the video tape simultaneously.

Attention is now directed to the method of applying foil indicia on a video tape cassette of the present invention. Initially, a plurality of video cassettes 72 are mounted on apparatus 10. The programmable controller 71, shown schematically in FIG. 1, indexes a single video cassette 12 to a clamping position 74 at workstation 28 adjacent first hot stamping means 24 and second hot stamping means 26.

A hot foil indicia 14 is applied on a first predetermined surface 68 by a first hot foil stamping means 24. A second hot foil stamping indicia 18 is applied to a second predetermined surface 70 by second hot foil stamping means 26. First predetermined surface 68 is disposed in a first plane 76 and second predetermined surface 70 is disposed in a second plane 78. First plane 76 is located spatially at a substantial angular relation to second plane 78. This substantial angular relation is dictated by the particular physical characteristics of video cassette 12 and by the desired location of application of the foil indicia.

Common video cassettes include a dust door or cover 16 and a spine 20 wherein a marketing indicia 14 and a time stamp indicia 18 are deposited. In the method of the present invention the video cassette used has a dust cover 16 defining a first plane 76 and spine 20 defining a second plane 78 which is perpendicular to first plane 76.

After the first and second hot foil stamping means apply the foil indicia on the video cassette, the cassette is next indexed by the programmable controller on conveyor 48 to an exit position 80. The video cassette is eventually removed from the exit position 80 for packing and distribution.

The step of applying the foil indicia on a first predetermined surface is further differentiated into the steps of heating die 34 having an indicia design 36 disposed thereon for transfer to the video cassette, indexing the continuous sheet of hot melt foil 40 of predetermined length past die 34, and imposing a force on die 34 sufficient to bring the die in contact with both hot melt foil 40 and predetermined first surface 68 such that the indicia design 36 is transferred onto the first predetermined surface. U.S. Pat. No. 4,343,670 to Brown discloses generally, the process of hot foil stamping on a plastic surface and is incorporated herein by reference.

Second hot foil stamping means 26 contemplates virtually the same steps in applying a foil indicia on a second predetermined surface of the video cassette. The steps for applying the foil indicia are (i) heating die 58 having an indicia design 36 disposed thereon for transfer to the video cassette, (ii) indexing the continuous sheet of hot melt foil 40 of predetermined length past die 34, and (iii) imposing a force on die 34 sufficient to bring the die in contact with both hot melt foil 40 and predetermined second surface 70 such that the indicia design 36 is transferred onto the second predetermined surface.

In one embodiment of the present invention the first hot foil stamping means 24 is disposed such that reciprocating fluid biasing cylinder 38 reciprocates in a substantially vertical path to apply the foil indicia 14 on dust cover 16 of the video cassette tape. Second hot foil stamping means 26 is disposed on the apparatus such that reciprocating fluid biasing cylinder 62 reciprocates in a substantially horizontal path applying foil indicia 18 on the spine 20 of the video cassette.

In accordance with the invention, it was determined that application of both the first foil indicia 14 and second foil indicia 18 simultaneously affords a better transfer of the foil indicia onto the surfaces of the video cassette. The simultaneous application of pressure in both vertical and horizontal directions at the work station better stabilizes the video cassette at the stamping position 78 to allow better transfer of the material to the plastic surface. The higher quality indicia deposition occurs because the dies that are contacting the video cassette surfaces in the stamping process also act as stabilizers for holding the video tape.

The method of applying foil indicia on a video cassette of the present invention not only affords higher quality indicia deposition, but allows affordable manufacture of custom marked video cassettes in low volumes. The present invention allows utilization of common video cassettes to be manufactured with both a marketing indicia 14 on dust cover 16 and a time length stamp 18 on spine 20 of the video cassette with one operation. Additional manufacture or assembly steps currently required in the present industry process i.e. stamping dust covers separately from the rest of the video cassette and eventually assembling the entire cassette in a different operation, are eliminated.

The present invention allows customized video cassettes to be economically produced with volumes as low as 50 tapes by quick changes in particular dies with different indicia designs. No extra handling, inventory requirements or added expenses are incurred by the new process of the present invention.

The present invention has been illustrated and described in connection with a few selected embodiments, and it is understood that these are illustrative of the invention and are by no means restrictive thereof. It is reasonably expected that those skilled in the art can make numerous revisions and adaptations of the invention and is intended that such revisions and adaptations will be included within the scope of the following claims.

What is claimed is:

1. A method for applying foil indicia on a plurality of video cassettes, each one of the video cassettes being box-shaped and including a hinged dust door at one end of the cassette having a first predetermined surface disposed in a first plane, said cassette further including a spine at the opposing other end of said cassette constituting a second predetermined surface disposed in a second plane substantially perpendicular to said first plane, said method comprising the steps of:

a) mounting said plurality of video cassettes stacked one upon the other over a conveyor;
b) intermittently feeding said video cassettes to a stamping station by indexing one said video cassette on said conveyor to a stamping position adjacent a first hot foil stamping means and a second hot foil stamping means;
c) applying a first foil indicia on the dust door upon said first predetermined surface;
d) applying a second foil indicia on said spine simultaneously with application of said first foil indicia on said dust door;
e) providing means for applying said foil indicia on said predetermined surfaces and simultaneously stabilizing said video cassette upon application of said foil indicia;
f) indexing said video cassette on said conveyor to an exit position; and
g) removing said video cassette from said conveyor.

2. A method for applying foil indicia on a video cassette as in claim 1 wherein the step of applying a foil indicia on said dust door further comprises the steps of:

a) heating a first die having an indicia design disposed thereon;
b) indexing a continuous sheet of hot melt foil of predetermined length adjacent said first die; and
c) imposing a force on said first die sufficient to bring said first die in contact with said hot melt foil and said predetermined first surface such that said indicia design is transferred onto said dust door.

3. A method for applying foil indicia on a video cassette as in claim 2 wherein the step of applying a foil indicia on said spine further comprises the steps of:

a) heating a second die having an indicia design disposed thereon;
b) indexing a continuous sheet of hot melt foil of predetermined length adjacent said second die; and
c) imposing a force on said second die sufficient to bring said second die in contact with said hot melt foil and said spine such that said indicia design is transferred onto said spine.

4. A method for applying foil indicia on a video cassette as in claim 2 wherein the step of imposing a force on said die further comprises the step of:

activating a reciprocating fluid biasing cylinder affixed to said die to generate a pressure in a substantially vertical direction on said dust door and said hot melt foil.

5. A method for applying foil indicia on a video cassette as in claim 4 wherein the step of imposing a force on said die further comprises the step of:

activating a reciprocating fluid biasing cylinder affixed to said die to generate a pressure in a substantially horizontal direction on said spine and said hot melt foil.

6. An apparatus for applying a foil indicia on a plurality of video cassettes, each one of the video cassettes being box-shaped and including a hinged dust cover at one end of the cassette having a first predetermined surface disposed in a first plane, said cassette further including a spine at the opposing other end of said cassette constituting a second predetermined surface disposed in a second plane substantially perpendicular to said first plane, said apparatus comprising:

a stacking station for stacking said plurality of video cassettes;
a stamping station;
an unloading station; and
indexing means including a conveyor for intermittently feeding one said video cassette at a time to said stamping station and subsequently to said unloading station;
a first hot foil stamping means for applying a first foil indicia at said stamping station on said first predetermined surface of said video cassette; and
a second hot foil stamping means for applying a second foil indicia at said stamping station on said second predetermined surface of said video cassette simultaneously with the application of said first foil indicia and thereby stabilizing said video cassette throughout application of said first and second indicia.

7. An apparatus as in claim 6 wherein the first hot foil stamping means comprises:

a heating block;
a heating element in contact with said heating block;

a die removably attached to said heating block including an indicia design disposed on one side;

a reciprocating fluid biasing cylinder attached to said heating block for generating linear force on said heating block;

a continuous sheet of hot melt foil disposed adjacent said die; and a foil feeding means for indexing a predetermined segment of said hot melt foil past said die.

8. An apparatus as in claim 6 wherein the second hot foil stamping means comprises:

a heating block;

a heating element in contact with said heating block;

a die removably attached to said heating block including an indicia design disposed on one side;

a reciprocating fluid biasing cylinder attached to said heating block for generating linear force on said heating block;

a continuous sheet of hot melt foil disposed adjacent said die; and a foil feeding means for indexing a predetermined segment of said hot melt foil past said die.

9. An apparatus as in claim 7 wherein the reciprocating fluid biasing cylinder reciprocates in a substantially vertical direction.

10. An apparatus as in claim 8 wherein the reciprocating fluid biasing cylinder reciprocates in a substantially horizontal direction.

11. An apparatus as in claim 6 wherein said indexing means includes a programmable controller for signaling simultaneous operation of the first hot foil stamping means and the second hot foil stamping means such that said foil indicia are applied simultaneously to said dust cover and spine, thereby creating a clean foil indicia transfer.

12. A method for applying foil indicia on a plurality of video cassettes, each one of the video cassettes being box-shaped and including a hinged dust cover at one end of the cassette having a first predetermined surface disposed in a first plane, each cassette further including a spine at the opposing other end of said cassette constituting a second predetermined surface disposed in a second plane substantiality perpendicular to said first plane, said method comprising:

a) mounting a video cassette on a conveyor;

b) indexing said video cassette on said conveyor to a stamping position adjacent a first hot foil stamping means and a second hot foil stamping means;

c) applying a first foil indicia on a first predetermined surface of said video cassette;

d) applying a second foil indicia on a second predetermined surface simultaneously with application of said first foil indicia on said dust cover;

said first and second foil indicia being applied to said video cassette simultaneously to a respective one of said first and second predetermined surfaces;

said first foil indicia being applied to said first predetermined surface by the sequential steps of:

(i) heating a first die having an indicia design disposed thereon;

(ii) indexing a continuous sheet of hot melt foil of predetermined length adjacent said first die; and (iii) imposing a force on said first die sufficient to bring said first die in contact with said hot melt foil and said predetermined first surface such that said indicia design is transferred onto said first predetermined surface;

said second foil indicia being applied to said second predetermined surface by the steps of:

(i) heating a second die having an indicia design disposed thereon;

(ii) indexing a continuous sheet of hot melt foil of predetermined length adjacent said second die; and (iii) imposing a force on said first die sufficient to bring said second die in contact with said hot melt foil and said second predetermined surface such that said indicia design is transferred onto said second predetermined surface;

e) indexing said video cassette on said conveyor to an exit position; and f) removing said video cassette from said conveyor.

* * * * *